US009185473B2

(12) United States Patent
Yi et al.

(10) Patent No.: US 9,185,473 B2
(45) Date of Patent: Nov. 10, 2015

(54) NETWORK NODE FOR AN OPTICAL TRANSPORT NETWORK

(75) Inventors: Xiaobo Yi, Shanghai (CN); Xuming Cheng, Shanghai (CN); Hou Xuan Hu, Shanghai (CN); Yangjun Li, Shanghai (CN); Xiaohong Zhang, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 114 days.

(21) Appl. No.: 13/885,642

(22) PCT Filed: Dec. 8, 2011

(86) PCT No.: PCT/EP2011/072162
§ 371 (c)(1),
(2), (4) Date: May 15, 2013

(87) PCT Pub. No.: WO2012/084527
PCT Pub. Date: Jun. 28, 2012

(65) Prior Publication Data
US 2013/0266029 A1 Oct. 10, 2013

(30) Foreign Application Priority Data

Dec. 21, 2010 (CN) .......................... 2010 1 0612639
Apr. 7, 2011 (EP) ..................................... 11305403

(51) Int. Cl.
*H04Q 11/00* (2006.01)
*H04Q 11/04* (2006.01)
*H04Q 11/06* (2006.01)
*H04J 3/16* (2006.01)
*H04L 12/933* (2013.01)

(52) U.S. Cl.
CPC .......... *H04Q 11/0001* (2013.01); *H04J 3/1652* (2013.01); *H04J 3/1694* (2013.01); *H04L 49/10* (2013.01); *H04L 49/15* (2013.01); *H04Q 11/0478* (2013.01); *H04Q 11/06* (2013.01); *H04J 2203/0012* (2013.01); *H04Q 2213/1301* (2013.01)

(58) Field of Classification Search
None
See application file for complete search history.

(56) References Cited

U.S. PATENT DOCUMENTS 7,130,276 B2 * 10/2006 Chen et al. ..................... 370/249
8,848,533 B1 * 9/2014 Stuart et al. ................... 370/235
(Continued)

FOREIGN PATENT DOCUMENTS

EP 1217868 6/2002

OTHER PUBLICATIONS

Toru Katagiri et al; Proposal on Re-Assignment of Payload Type for ODUflex (GFP); ITU-T Drafts; Study Period 2009-2012; International Telecommunication Union, Geneva; CH; Vol. Study Group 15; 11, Sep. 9, 2010; pp. 1-2; XP017448218.

*Primary Examiner* — Christopher Crutchfield
(74) *Attorney, Agent, or Firm* — Patti & Malvone Law Group, LLC

(57) ABSTRACT

A network node for an optical transport network is disclosed, which has a signal input for receiving a multiplexed transport signal carrying a number of n timeslots of a fixed size data capacity, a demultiplexer for demultiplexing the received signal into a number of m>1 sub-signals, each sub-signal carrying a fraction of n/m of said timeslots, one or more space switch modules for configurably switching said sub-signals, and a multiplexer receiving sub-signals from said one or more space switch modules; for multiplexing timeslots from said sub-signals into an outgoing multiplexed transport signal carrying n of said timeslots. The multiplexer is connected to the one or more switch modules over a number of l>m interconnections and receives from said one or more switch modules up to l sub-signals. Moreover, the multiplexer can be configured to select the n timeslots for the outgoing multiplexed transport signal from the up to l sub-signals.

8 Claims, 4 Drawing Sheets

(56) References Cited

U.S. PATENT DOCUMENTS

| | | | |
|---|---|---|---|
| 2007/0264015 A1* | 11/2007 | Li et al. | 398/45 |
| 2010/0226652 A1* | 9/2010 | Vissers et al. | 398/98 |
| 2011/0255552 A1* | 10/2011 | Ellegard | 370/419 |
| 2011/0286744 A1* | 11/2011 | Shin et al. | 398/45 |
| 2012/0002965 A1* | 1/2012 | Bellato et al. | 398/52 |
| 2012/0163812 A1* | 6/2012 | Youn et al. | 398/45 |
| 2012/0263475 A1* | 10/2012 | Su et al. | 398/100 |
| 2013/0028602 A1* | 1/2013 | Fu et al. | 398/58 |

* cited by examiner

| Port on MUX M4 | Incoming signal | ODU0 TS | |
|---|---|---|---|
| 1 | B1 | b1 | b2 |
| 2 | A4 | a7 | a8 |
| 3 | B4 | b7 | b8 |
| 4 | A3 | a5 | a6 |
| 5 | B3 | b5 | b6 |
| 6 | A1 | a1 | a2 |
| 7 | A2 | a3 | a4 |
| 8 | B2 | b3 | b4 |

NETWORK NODE FOR AN OPTICAL TRANSPORT NETWORK

FIELD OF THE INVENTION

The present invention relates to the field of telecommunications and more particularly to a network node for an optical transport network and a related method for switching signals in an optical transport network.

BACKGROUND OF THE INVENTION

An optical transport network serves for the backbone transport in telecom networks. Signal transmission is typically based on time division multiplexing. The ITU has defined in G.709 a standard for the Optical Transport Network. The initial version of G.709 provided three levels of multiplexing, which were termed Optical Data Units ODU1, ODU2, and ODU3, with data rates of 2.5 Gb/s, 10 Gb/s, and 40 Gb/s, respectively. At each multiplexing level, a corresponding framed signal structure including section overhead and FEC bytes was defined, which were termed Optical Transport Units OTU1, OTU2, and OTU3. An OTU2 for example can carry either one ODU2 or four ODU1. Later, a lower size multiplexing level ODU0 with a capacity of 1.25 Gb/s was defined to support transport of Gigabit Ethernet signals, where an OTU1 can carry two ODU0. Additionally, a data unit called ODUflex allows to flexibly adjust the container size in increments of 1.25 Gb/s timeslots (TS). No transport frame is defined, however, for ODU0 and ODUflex containers, so these can only occur as lower order data units multiplexed within an OTU1 or higher transport frame.

SUMMARY OF THE INVENTION

It is expected, that more and more Gigabit Ethernet traffic signals need to be encapsulated in ODU0 and transported by the OTN network. Moreover, the OTN network tends to become a multi service platform to carry also fiber channel signals and the CPRI traffic between base band units and remote radio unit of the base stations for 2G/3G/LTE mobile networks.

In the access and aggregation segment of the network, OTUx signals may not be fully loaded. For example, a transport signal may carry only 1×ODU0 inside an OTU1, or 1×ODUflex with TS<8 inside an OTU2. If such signals are not aggregated before they go to the core network, the bandwidth of the network will be highly wasted. The switching and aggregation should hence operate at ODU0/flex granularity instead of ODU1/2. Therefore, a need exists, for a network element which is well suited for the access and aggregation network, and allows switching and aggregation at ODU0 and ODUflex granularity.

These and other objects that appear below are achieved by a network node for an optical transport network, which has a signal input for receiving a multiplexed transport signal carrying a number of n timeslots of a fixed size data capacity, a demultiplexer for demultiplexing the received signal into a number of m>1 sub-signals, each sub-signal carrying a fraction of n/m of said timeslots, one or more space switch modules for configurably switching said sub-signals, and a multiplexer receiving sub-signals from said one or more space switch modules; for multiplexing timeslots from said sub-signals into an outgoing multiplexed transport signal carrying n of said timeslots. The multiplexer is connected to the one or more switch modules over a number of l>m interconnections and receives from said one or more switch modules up to l sub-signals. Moreover, the multiplexer can be configured to select the n timeslots for the outgoing multiplexed transport signal from the up to l sub-signals.

This allows to extend the granularity of a distributed ODU switch system from ODU1/2 to ODU0/flex timeslots by overprovisioning the bandwidth between the space switch and the timeslot switching function of the multiplexer. A system that supports ODU1/2 granularity can thus be revised to support ODU0/flex granularity while keeping the system back-panel unchanged, or make the back-panel design less complex and more cost efficient for new systems.

BRIEF DESCRIPTION OF THE DRAWINGS

Preferred embodiments of the present invention will now be described with reference to the accompanying drawings in which

FIG. 2 shows ODU0 switching and aggregation at the output side multiplexers;

DETAILED DESCRIPTION OF THE INVENTION

Figure 1:
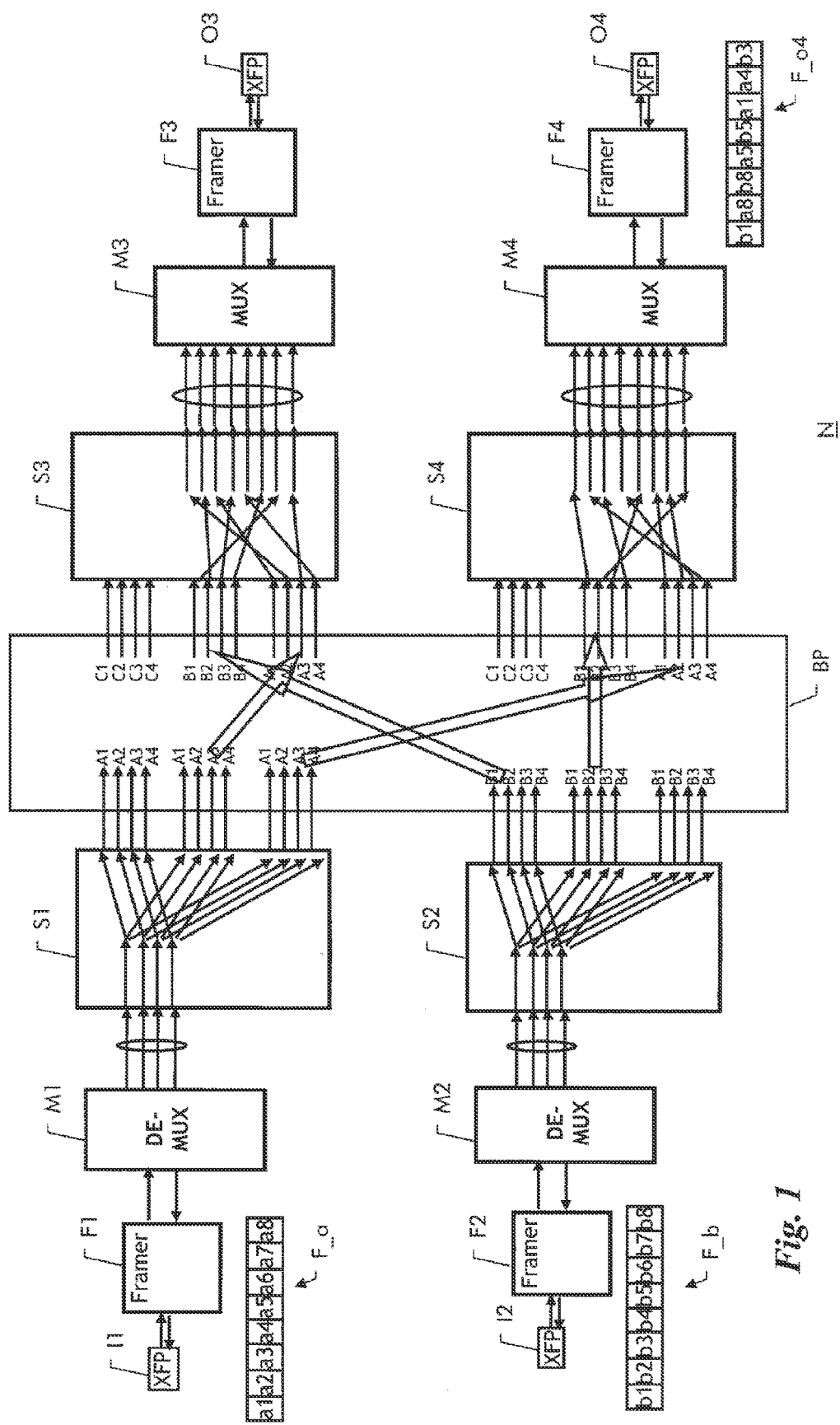
FIG. 1 shows a block diagram of a network node with distributed switching architecture.

An embodiment of a network node N which has a distributed switching architecture is shown in FIG. 1. It contains a number of signal inputs I1, I2, and a number of signal outputs O3, O4. For the sake of lucidity, only two inputs I1, I2 and two outputs O3, O4 are shown, while real network nodes typically contain a larger number of inputs and outputs. Inputs and outputs are implemented as conventional XFP (10 Gb Small Form Factor Pluggable) modules. An XFP module is a protocol-independent optical transceiver for 10 Gigabit per second SONET/SDH, Fibre Channel, Gigabit Ethernet, 10 Gigabit Ethernet and other applications.

XFP module I1 is connected to a framer F1 for OTU2 signal frames. At its output, framer F1 is connected to a demultiplexing circuit M1, which has four outputs connected to a space switch module S1. Space switch S1 is connected to a full mesh backplane BP.

Similarly, input XFP module I2 is connected via a framer F2 and a demultiplexing circuit M2 to a space switch module S2, which is also connected to full mesh backplane BP.

At the output side, the backplane BP leads to space switch modules S3, S4, which are connected to multiplexing circuits M3, M4, respectively. Each multiplexing circuit M3, M4 leads via a respective framer F3, F4 to output side XFP modules O3, O4. The interconnection between multiplexers M3 and M4 and switch modules S3 and S4 is achieved via 8 parallel connections, respectively, thus allowing the multiplexers M3, M4 to receive 8 parallel signals from space switches S3, S4.

The function of network node N is as follows. XFP module I1 receives an OTU2 formatted optical signal at a line rate of 10.7 Gb/s. XFP module I1 converts the optical signal to an electrical format. Framer F1 terminates the frame overhead, processes the FEC bytes, and forwards the processed signal to demultiplexer M1. It is assumed that the received OTU2 carries 8 ODU0 containers. Demultiplexer M1 extracts the 8 ODU0 from the received signal and maps these into 4 OTU1 at the output side towards switch S1, each OTU1 carrying 2 of the 8 ODU0s.

An example frame F_a is shown schematically at the input I1. It contains 8 ODU0 timeslots a1-a8. The four parallel outputs of demultiplexer M1 are denoted as A1 to A4. In the subject embodiment, timeslots a1 and a2 are on output A1, a3 and a4 on output A2, a5 and a6 on output A3 and a7 and a8 on output A4.

Via full mesh backplane BP, switch module S1 is connected to each output side switch module S3, S4. In order to support aggregation and switching at ODU0 level, switch S1 broadcasts the four parallel signals A1-A4 from multiplexer M1 to all output side switch modules S3, S4.

Input side switch module S2 operates in the very same way and is also connected via full mesh backplane BP to each output side witch modules S3, S4.

A second example frame F_b is shown schematically at the input I2. It contains 8 ODU0 timeslots b1-b8. The four parallel outputs of demultiplexer M2 are denoted as B1 to B4. In the subject embodiment, timeslots b1 and b2 are on output B1, b3 and b4 on output B2, b5 and b6 on output B3 and b7 and b8 on output B4.

Output side switch modules S3, S4 operate to select from all signals received via backplane BP up to 8 OTU1 signals and switch these to the output side multiplexers M3, M4, respectively. Each output side switch module S3, S4 receives signals A1-A4 from switch S1 and B1-B4 from switch S2. In order to emphasize that typically more than two signal inputs are available, FIG. 1 further shows a third set of input signals C1-C4 coming from backplane BP.

Multiplexers M3, M4 manage and switch ODU0 timeslots received within OTU1 signals and will aggregate ODU0 timeslots from different input signals into a fully loaded output signal. In particular, the 8 OTU1 signals received at multiplexer M3 from switch module S3 carry up to 16 ODU0, while at the output side of multiplexer M3, an OTU2 signal with a capacity of 8 ODU0 is delivered. Multiplexer M3 thus selects from the 16 received ODU0 timeslots the 8 ODU0s destined for output port O3 and multiplexes these into an OTU2 frame. Framer F3 inserts the appropriate section overhead and FEC bytes and forwards the fully loaded OTU2 frames to XFP module O3 for transmission as optical OTU2 signal to the optical transport network.

An example OTU2 signal frame F_o4 is shown at output O4. FIG. 2 shows in more detail how multiplexer M4 assembles the timeslots for frame F_o4. Switch S4 switches 8 OTU1 signals received from backplane BP to multiplexer M4. Multiplexer M4 has 8 inputs 1-8. At input 1, multiplexer M1 receives signal B1 from switch S2. Signal B1 carries input ODU0 timeslots b1 and b2. Multiplexer M1 selects timeslot b1 and inserts it as first timeslot into output frame F_o4. At input 2, multiplexer M4 receives signal A4, carrying timeslots a7 and a8 and selects for the second timeslot position in output frame F_o4 timeslot a8, and so on. The result is an output OTU2 signal carrying ODU0 timeslots b1, a8, b8, a5, b5, a1, a4, and b3.

In the very same way as ODU0 timeslots, the network node can also handle individual ODUflex timeslots (TS). For example an input signal can carry an ODUflex with 5 timeslots (ODUflex-5TS). The 5 ODUflex timeslots will then be distributed over three OTU1 signals and broadcasted via backplane BP to all output switches. At a designated output switch, all the three OTU1 signals will be selected and forwarded to the associated multiplexer, where the 5 ODUflex timeslots are selected and assembled into an output OTU2 signal. The remaining 3 timeslots in the output OTU2 signal can be filled with ODU0, ODU1 or ODUflex timeslots from other input ports.

Likewise, ODU1 signals can be switched, too. An ODU1 signal inside OTU1 would be handled by output side multiplexer as two "pseudo" ODU0 timeslots and assembled both together into the output ODU2 signal. In the same way, an ODU2 can be switched as 8 consecutive "pseudo" ODU0 timeslots reverse multiplexed into 4 internal OTU1 signals.

It should be clear to those skilled in the art, that the output side multiplexers not necessarily take ODU0 timeslots from 8 different OTU1 inputs, but can also select both timeslots from one OTU1, thus requiring less than 8 OTU1 input signals.

It is preferable, however, that the multiplexers M3, M4 have a fixed relationship between their physical ports and the time slots in the output signal. The multiplexer would then select exactly one ODU0 from each incoming OTU1 signal. E.g., timeslot #1 of the output OTU2 signal is selected from input 1, timeslot #2 from input 2 and so on. If both signals from a particular internal OTU1 signal are to be selected, the output side switch module S3, S4 would duplicate the signal to two inputs of the multiplexer. This leads to a much simpler design for the multiplexer circuits M3, M4.

In the same way, demultiplexers M1, M2 can have fixed relationship between timeslots in the OTU2 input signal and physical output ports, such that ODU0 timeslots #1 and #2 always go to the first output port, timeslots #3 and #4 go to the second output port and so on.

Preferably, semiconductor implemented crossbar switches are used as switch modules S1-S4. Such crossbar switches are available on the market and contain typically of a set of input amplifiers or retimers connected to a series of metalizations or "bars" within a semiconductor device. A similar set of metalizations or "bars" are connected to output amplifiers or retimers. At each cross-point where the "bars" cross, a pass transistor is implemented which connects the bars. When the pass transistor is enabled, the input is connected to the output.

Figure 3:
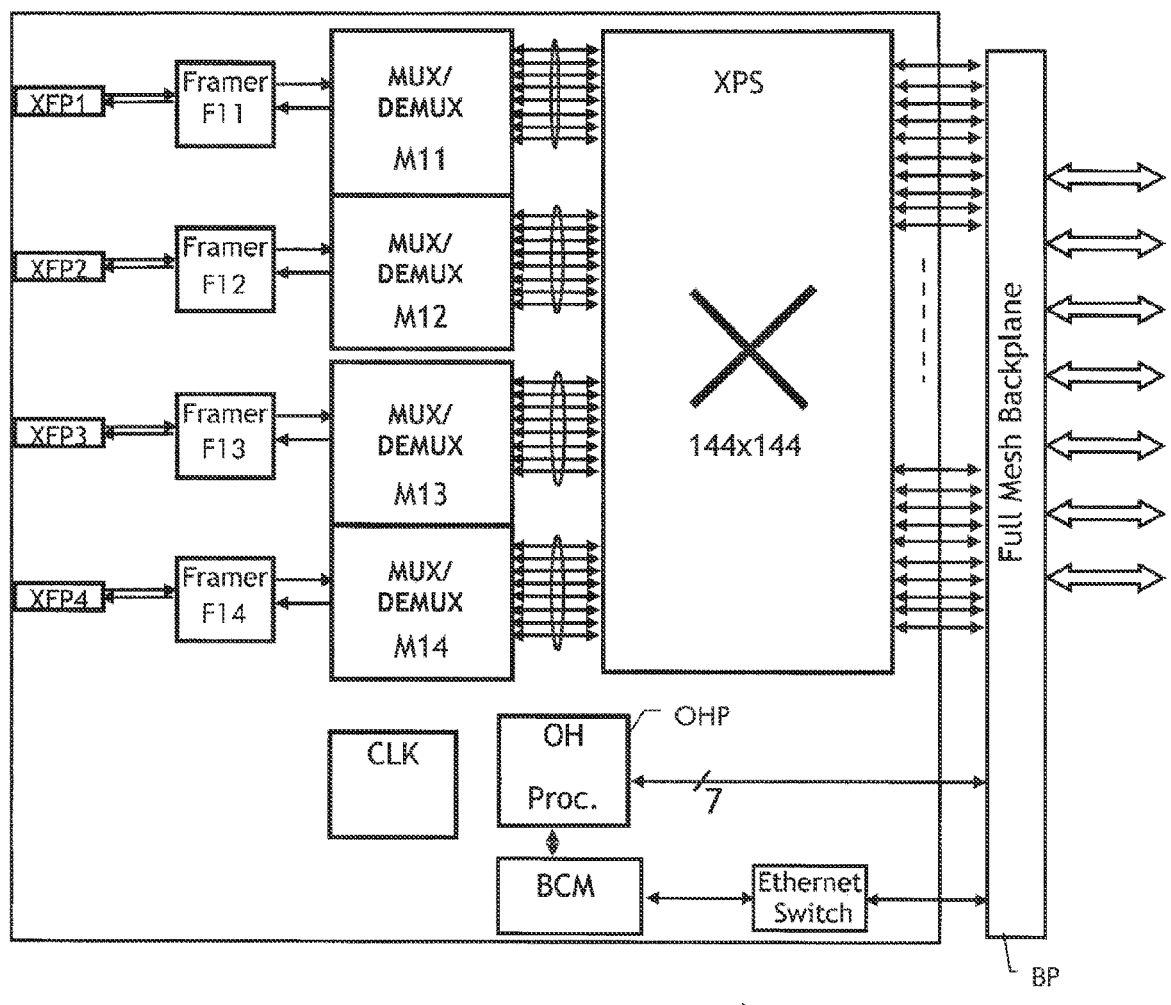
FIG. 3 shows a block diagram of a line card for use in a network node with a full mesh backplane.

A line card for use in a network node with full mesh backplane is shown schematically in FIG. 3. Line card LC combines inputs and outputs and operates fully bidirectional. Line card LC contains four optical XFP transceiver modules XFP1-XFP4 for four independent OTU2 signals. Each transceiver XFP1-XFP4 leads to a respective framer F11-F14, which terminates section overhead and processes the FEC bytes of the OTU2 signals in receive and transmit direction. The processed OTU2 signals from framers F11-F14 are fed to respective multiplexing/demultiplexing circuits M11-M14, which combine the demultiplexing function at the receive side and the multiplexing function of the transmit side. In a preferable implementation, two such mux/demux circuits can be implemented into a single FPGA, such as M11 and M12 or M13 and M14 in FIG. 3.

Each mux/demux circuit M11-M14 is connected over a 2×8 lines wide parallel interface to a semiconductor crosspoint switch XPS. 8 lines between crosspoint switch XPC and each mux/demux circuit M11-M14 are provided for signal in transmit direction and 8 lines are provided in receive direction. In particular, the 8 lines in transmit direction carry 8 OTU1 formatted signals with 16 ODU0 or ODUflex timeslots in total, while the interface between a mux/demux circuit M11-M14 and the framer F11-F14 has only the capacity of 1×OTU2 with 8 ODU0 or ODUflex timeslots in total. Due to this widening or expansion of the capacity of the mux/demux circuit towards the crosspoint switch, a fully flexible switching and aggregation functionality at a granularity of ODU0 or ODUflex timeslots can be achieved.

For the receive side direction between the mux/demux circuits M11-M14 and the crosspoint switch XPC it is preferable but not necessary to apply the same expansion from 4 to 8 ODU1 equivalents on 8 separate lines, as this would lead to a higher flexibility of possible switching states, in particular when considering broadcast or protection connections.

Crosspoint switch XPC is a 144×144 switch module, which has 144 inputs and outputs, respectively, and allows signal rates of up to 3.2 Gb/s, which is sufficient for OTU1 signals. 112 of the 144 inputs and outputs, respectively, of crosspoint switch XPC lead to the full mesh backplane BP.

The line cards further contains a clock generator CLK, an overhead processor OHP and an on-board controller BCM. Clock generator CLK provides the clock signals for the mux/demux circuits and the framers. Overhead processor OHP receives and processes overhead information from the framers and provides to the framers overhead information for OTU2 signals to be transmitted. On-board controller BCM configures mux/demux circuits M1-M4 and the crosspoint switch XPC. The board controller is connected to the overhead processor OHP and via an Ethernet switch to a central controller (not shown) and the on-board controllers of other line cards. The overhead processor OHP is connection via dedicated lines in the backplane BP to the overhead processors of other line cards.

Figure 4:
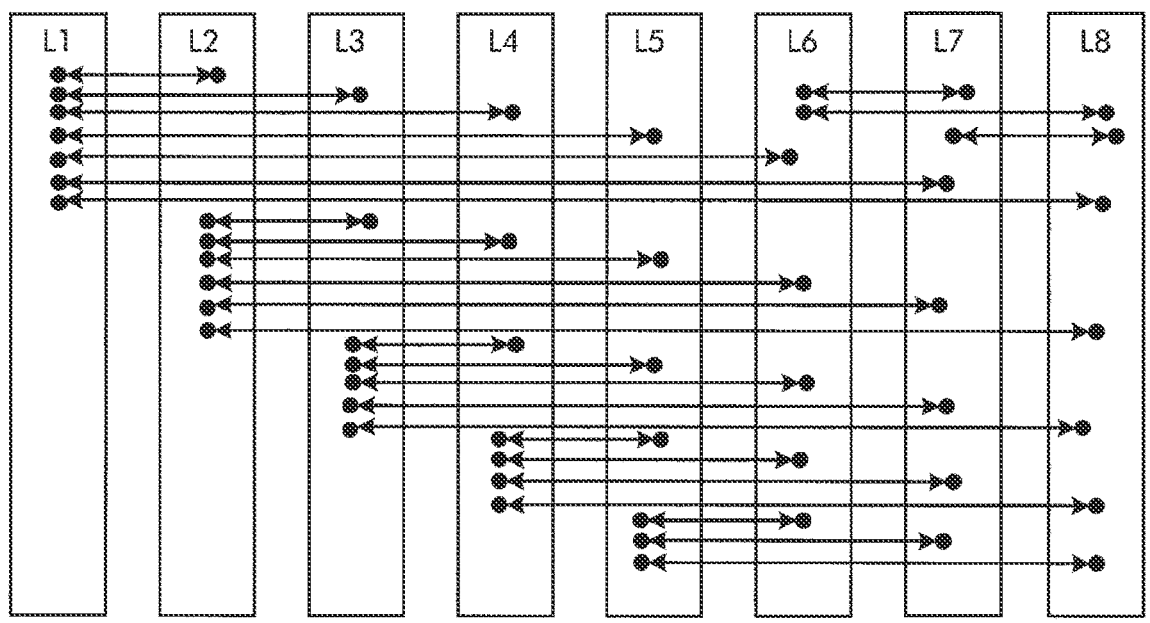
FIG. 4 shows the interconnections between different line card slots of a full mesh backplane.

The wiring of the full mesh backplane is shown in FIG. 4. The backplane has 8 slots L1-L8, which can be equipped with line cards. Each slot has 7 groups of interconnections, one to each other slot. Each group or set of connections is represented in FIG. 4 by one arrow and contains 2×16 backplane interconnections (16 for each direction), 2×4 for each mux/demux circuit on each line card. In the embodiment, interconnections between crosspoint switches via the backplane BP use the SFI-4.2 interface defined by the OIF as industry standard chip-to-chip interface for 2.5 Gb/s signals. So, each arrow represents 4×SFI-4.2, which sums up to a total of 40 G per slot. This has the advantage that some of the slots of the backplane BP can also be equipped with lines cards for OTU3 signals.

The above embodiment allows to switch and aggregate ODU0 and uses an internal signal format similar to OTU1, where each OTU1 carries 2 ODU0. It should be clear that the internal signals do not necessarily contain any section overhead bytes, as these are terminated in the line cards. Such overhead bytes of internal signals could be left empty, or could be omitted completely.

The concept of providing an expansion of the capacity of mux/demux circuits from and towards local space switches, which are mutually interconnected through a mesh of interconnections for example by a full mesh backplane, can also be applied for switching of other kind of multiplexed signals. For example, in the very same way, it would be possible to switch ODU1 internally distributed inside OTU2 signal structures. Crosspoint switches and backplanes for signal rates of 10 Gb/s are available today, and could be employed in a node architecture similar to the above embodiment. Since an OTU2 carries up to 4 ODU1, the expansion factor between the mux/demux circuits and the local space switch on the line cards could be up to a factor of 4, hence.

The switching modules can be implemented with semiconductor crossbar or crosspoint switches as explained above. It is possible to implement receive side switch modules and transmit side switch modules as different, dedicated switch modules, as shown in FIG. 1, or both directions can be combined into a single switch module for each line card. In the former case, line cards, which carry I/O ports for receive and transmit direction would be equipped with two dedicated switch modules for receive and transmit direction.

As explained before, switch modules at the receive side operate to broadcast the signals over the backplane to each other switch module at the transmit side. This is a preferred implementation as it simplifies the control of the receive side switch modules, however this is not mandatory. It would also be possible to control the receive side switch modules such that signals are only distributed to those transmit side switch modules, where the signals are actually needed. As in such an implementation, only a fraction of the backplane interconnections carry a signal at the same time, this may contribute to reduce crosstalk, if that is of concern. It can also help to reduce the power consumption of the equipment, if that is of concern.

It is also possible that the switch module at the receive side switches back one or more of the OTU1 signals in transmit direction to an I/O port arranged on the same line card. This may make sense in an embodiment as shown in FIG. 3, where more than one I/O ports are arranged on the same line card, or in case there is only one I/O port per line card, to implement a line loopback at the same I/O port for one or more of the ODU0 or ODUflex timeslots, e.g. for test and maintenance purposes. It would also be appreciated by those skilled in the art, that the line card of FIG. 3 as a stand-alone device (i.e. without any backplane connections) would already implement a small 4×4 OTU2 switching node at a switching granularity of ODU0 and ODUflex timeslots.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

The invention claimed is:

1. A network node for an optical transport network, comprising:
   a signal input for receiving a multiplexed transport signal carrying a number of n timeslots of a fixed size data capacity;

a demultiplexer for demultiplexing the received signal into a number of m>1 sub-signals, each sub-signal carrying a fraction of n/m of said timeslots;

one or more space switch modules for configurably switching said sub-signals; and a multiplexer receiving sub-signals from said one or more space switch modules; for multiplexing timeslots from said sub-signals into an outgoing multiplexed transport signal carrying n of said timeslots;

wherein said multiplexer is connected to said one or more switch modules over a number of l=n interconnections and receives from said one or more switch modules up to l sub-signals, and wherein said multiplexer configurably selects said n timeslots for said outgoing multiplexed transport signal from said up to l sub-signals, and wherein said multiplexer selects one timeslot from each of said sub-signals received from said one or more switch modules.

2. The network node according to claim 1, further comprising a number of said space switch modules mutually interconnected through a mesh of interconnections.

3. The network node according to claim 1, further comprising at least one line card, comprising said signal input, said demultiplexer, one of said space switch modules, and said multiplexer.

4. The network node according to claim 2, wherein said mesh of interconnections comprises a full mesh backplane.

5. The network node according to claim 4, further comprising several of said line cards plugged into slots of said backplane.

6. The network node according to claim 5, wherein a switch module on a first of said line cards broadcasts all sub-signals from each demultiplexer of said line card to each other switch module, and wherein the switch modules on each other line cards are configured to select from said broadcasted sub-signals such sub-signals destined to be outputted at the respective line card.

7. The network node according to claim 1, wherein a fixed relationship exists between physical ports of said multiplexer and the timeslots in said outgoing multiplexed transport signal.

8. A method for switching and aggregating signals in an optical transport network, comprising:

receiving at a network node a multiplexed transport signal carrying a number of n timeslots of a fixed size data capacity;

demultiplexing the received signal into a number of m>1 sub-signals, each sub-signal carrying a fraction of n/m of said timeslots;

configurably switching said sub-signals in space domain to one or more output side multiplexers; and at one of said multiplexers, multiplexing timeslots from received sub-signals into an outgoing multiplexed transport signal carrying n of said timeslots;

wherein said multiplexer receives l=n sub-signals, and wherein said multiplexer configurably selects said n timeslots for said outgoing multiplexed transport signal from said l sub-signals, and wherein said multiplexer selects one timeslot from each of said l sub-signals.

* * * * *